Patented Oct. 17, 1933

1,931,239

UNITED STATES PATENT OFFICE 1,931,239

PROCESS OF PRODUCING ARTIFICIAL SILK

Rene Picard, Paris, France, assignor to Du Pont Rayon Company, New York, N. Y., a corporation of Delaware No Drawing. Application July 7, 1930, Serial No. 466,041, and in Germany July 29, 1929

3 Claims. (Cl. 18—54)

This invention relates to the production of artificial silk and has for an object the production of artificial silk possessing a peculiar opaque luster resembling that of mother-of-pearl.

An object of this invention is to provide a method of producing artificial silk wherein the viscose employed is prepared from cellulose rich in alpha cellulose and has a cellulose content in excess of 7.5%.

Another object of this invention is to provide a method of producing artificial silk wherein a coagulating bath containing an acid and a sulphate, such as sodium sulphate, alone or in combination with other sulphates, such as those of zinc and/or magnesium, is employed, the ratio of the acid to the sulphate or sulphates being 1:2 or more, and the acid content being from 100 to 150 grams per liter.

Other objects will appear from the following description and appended claims.

In the preparation of the viscose according to this invention, cellulose materials having high alpha cellulose contents, such as purified linters or the so-called high alpha cellulose wood pulp, are employed as the raw material. Sufficient cellulose material is used so that the resulting viscose contains at least 7.5% by weight of cellulose and preferably an amount in excess thereof. The alkali is employed, preferably, in such proportions that the ratio of the cellulose to the alkali is equal to that present in the usual viscoses, namely, 0.85. It is, of course, to be understood that other ratios, both higher and lower, may be used depending, of course, on the other factors involved. The period of aging the alkali cellulose depends on the cellulose content of the viscose and the proportion of the sulphate to acid in the coagulating bath. The larger the cellulose content and the higher the ratio of sulphate to acid the longer the period of aging. For instance, the alkali cellulose may be aged for 72 hours, but according to the other conditions, this period of time may be more or less.

A viscose having the composition above described, after ripening for a relatively short time until it has an index of 12 or more according to the Hottenroth or ammonium chloride scale, is spun in the usual manner in a coagulating bath containing an acid, such as sulphuric, and a sulphate, such as sodium sulphate. As previously stated, the proportions of the acid and the sulphate employed are such that the ratio of the sulphuric acid to the sulphate is at least one to two, and preferably higher. The quantity of sulphuric acid employed may vary from 100 to 150 grams per liter, and in view of the desired ratio to the sulphate, the latter may vary from 200 to 300 grams per liter, or more. If desired, a portion of the sodium sulphate may be partly replaced by magnesium sulphate or any other soluble sulphate. In addition to the previously mentioned ingredients, the coagulating bath may also contain zinc sulphate in amounts up to 3% or more. When zinc sulphate is employed in the bath, the amount used is preferably substituted for a corresponding amount of sodium sulphate. The best results have been obtained by substituting 3.5 parts of zinc sulphate for 2 parts of sodium sulphate.

To more clearly explain the invention, the following specific example illustrating one specific mode of carrying out the process is given. It is to be understood that the invention is not restricted to this example, since the portions of materials and other conditions may be varied provided a change in one of the factors is equalized by a change in the other factors.

*Example.*—Cellulose containing 96% alpha cellulose is steeped in 17.5% liquor for one hour. The pressed and shredded alkali cellulose is aged for 3 hours at 24° and then xanthated with 37% carbon disulphide.

From this a viscose containing 7.2% sodium hydroxide and 8.6% cellulose is prepared which, after ripening for 36 hours, is spun in the following coagulating bath maintained at a temperature of 48°–50° C.:

| | |
|---|---|
| Sulphuric acid | 128 grams per liter |
| Sodium sulphate | 270 grams per liter |
| Zinc sulphate | 30 grams per liter |

The thread is subjected to the usual subsequent treatments and finally finished.

The product resulting from the above process possesses a luster simulating that of mother-of-pearl. It is opaque and less metallic than the ordinary viscose rayon and closely resembles the luster of certain cuprammonium rayon. The mechanical properties of the product are in no way impaired and are substantially the same as those possessed by ordinary viscose rayon without the mother-of-pearl appearance. When examined under the microscope, no pigmentation can be discerned.

Since it is obvious that various changes may be made in the specific details above set forth, the invention is not restricted thereto except as set forth in the appended claims.

I claim:

1. A method of producing artificial thread having a luster similar to mother-of-pearl which comprises preparing a viscose solution having a cellulose content of over 7.5% from cellulose having an original high alpha cellulose content, ripening the viscose solution for a relatively short period, and spinning it in a bath containing 100 to 150 grams of sulphuric acid per liter and one or more sulphates in an amount at least twice that of the acid.

2. A method of producing artificial thread having a luster similar to mother-of-pearl which comprises preparing a viscose solution having a cellulose content of over 7.5% from cellulose having an alpha cellulose content of approximately 96%, ripening the viscose solution for a relatively short period, and spinning it in a bath containing 100 to 150 grams of sulphuric acid per liter and one or more sulphates in an amount at least twice that of the acid.

3. A method of producing artificial thread having a luster similar to mother-of-pearl which comprises preparing a viscose solution having a cellulose content of 8.5% of cellulose from cellulose having an original high alpha cellulose content, ripening the viscose solution for a relatively short period, and spinning it in a bath containing 128 grams of sulphuric acid per liter, 270 grams of sodium sulphate per liter, and 30 grams of zinc sulphate per liter.

RENE PICARD.